(12) United States Patent
Liebeskind et al.

(10) Patent No.: US 11,668,528 B2
(45) Date of Patent: Jun. 6, 2023

(54) TRANSMITTING AND DETECTING LIGHT WITH OPTICAL FIBER DURING SINTERING

(71) Applicant: Hewlett-Packard Development Company, L.P., Spring, TX (US)

(72) Inventors: John Liebeskind, Corvallis, OR (US); Andrew L. Van Brocklin, Corvallis, OR (US); David Champion, Corvallis, OR (US)

(73) Assignee: Hewlett-Packard Development Company, L.P., Sprint, TX (US)

( * ) Notice: Subject to any disclaimer, the term of this patent is extended or adjusted under 35 U.S.C. 154(b) by 0 days.

(21) Appl. No.: 16/972,109

(22) PCT Filed: Jan. 4, 2019

(86) PCT No.: PCT/US2019/012432
§ 371 (c)(1),
(2) Date: Dec. 4, 2020

(87) PCT Pub. No.: WO2020/142106
PCT Pub. Date: Jul. 9, 2020

(65) Prior Publication Data
US 2021/0325113 A1  Oct. 21, 2021

(51) Int. Cl.
*F27D 21/02* (2006.01)
*B22F 3/00* (2021.01)
(Continued)

(52) U.S. Cl.
CPC ............... *F27D 21/02* (2013.01); *B22F 3/003* (2013.01); *B22F 3/10* (2013.01); *C03C 13/048* (2013.01); *F27B 17/0016* (2013.01); *F27B 17/02* (2013.01); *G01N 21/55* (2013.01); *G02B 6/0008* (2013.01); *B22F 3/225* (2013.01); *B22F 2203/00* (2013.01); *B22F 2203/03* (2013.01);
(Continued)

(58) Field of Classification Search
CPC .. B22F 3/003; B22F 3/10; B22F 3/225; B22F 2203/03; B22F 2203/05; B22F 2998/10; B22F 2999/00; B22F 2203/00; C21D 1/34; C21D 11/005; F27B 17/0016; F27B 17/02; F27D 21/02; G01N 21/55; G01N 2021/8411; G01N 2201/1222; G02B 6/0008
USPC .......................................................... 432/32
See application file for complete search history.

(56) References Cited

U.S. PATENT DOCUMENTS 5,501,637 A * 3/1996 Duncan ................ G01J 5/0003
374/126
7,705,264 B2   4/2010 Hoebel et al.
(Continued)

*Primary Examiner* — Steven B McAllister
*Assistant Examiner* — Benjamin W Johnson
(74) *Attorney, Agent, or Firm* — Shook, Hardy & Bacon L.L.P.

(57) ABSTRACT

In an example implementation, a sintering system includes optical fiber installed into a sintering furnace. A support structure inside the furnace is to support a token green object in a predetermined position and to hold a distal end of the fiber adjacent to the predetermined position. A light source is operably engaged at a proximal end of the fiber to transmit light through the fiber into the furnace. A light detector is operably engaged at the proximal end of the fiber to receive reflected light through the fiber that scatters off a surface of the token green object.

14 Claims, 8 Drawing Sheets

(51) Int. Cl.
*B22F 3/10* (2006.01)
*C03C 13/04* (2006.01)
*F27B 17/00* (2006.01)
*F27B 17/02* (2006.01)
*G01N 21/55* (2014.01)
*F21V 8/00* (2006.01)
*C21D 1/34* (2006.01)
*C21D 11/00* (2006.01)
*B22F 3/22* (2006.01)
*G01N 21/84* (2006.01)

(52) U.S. Cl.
CPC ....... *B22F 2203/05* (2013.01); *B22F 2998/10* (2013.01); *B22F 2999/00* (2013.01); *C21D 1/34* (2013.01); *C21D 11/005* (2013.01); *G01N 2021/8411* (2013.01); *G01N 2201/1222* (2013.01)

(56) References Cited

U.S. PATENT DOCUMENTS

| | | |
|---|---|---|
| 8,940,220 B2 | 1/2015 | Raj et al. |
| 9,074,870 B2 | 7/2015 | Marzok et al. |
| 9,925,715 B2 | 3/2018 | Cheverton et al. |
| 10,065,270 B2 | 9/2018 | Buller et al. |
| 2007/0023971 A1 | 2/2007 | Saha et al. |
| 2009/0180118 A1* | 7/2009 | Feichtinger ............ F27D 21/02 356/402 |
| 2011/0069301 A1 | 3/2011 | Marzok et al. |
| 2013/0029281 A1* | 1/2013 | Jussel .................... A61C 13/20 432/32 |
| 2018/0154443 A1* | 6/2018 | Milshtein ............ B23K 26/342 |
| 2018/0154484 A1 | 6/2018 | Hall |
| 2018/0154580 A1 | 6/2018 | Mark |

\* cited by examiner

TRANSMITTING AND DETECTING LIGHT WITH OPTICAL FIBER DURING SINTERING

BACKGROUND

Powder metal manufacturing processes such as MIM (metal injection molding) and binder jetting produce metal objects from powdered metal materials. Such processes include preparing "green objects" that comprise powdered metal and a binder. The binder material can be removed from a green object during a binder burnout phase of a sintering process, and the powdered metal can then be consolidated and densified in the sintering process to improve the strength and integrity of the object. Sintering processes, such as pressurized sintering and atmospheric (pressureless) sintering, expose green objects to high temperatures for predetermined periods of time to bond the powdered metal particles together. During the sintering process, objects are brought up to an appropriate sintering temperature that is below the melting point of the metal powder, and the objects are maintained at the sintering temperature according to a predetermined time-temperature profile.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

Figure 1:
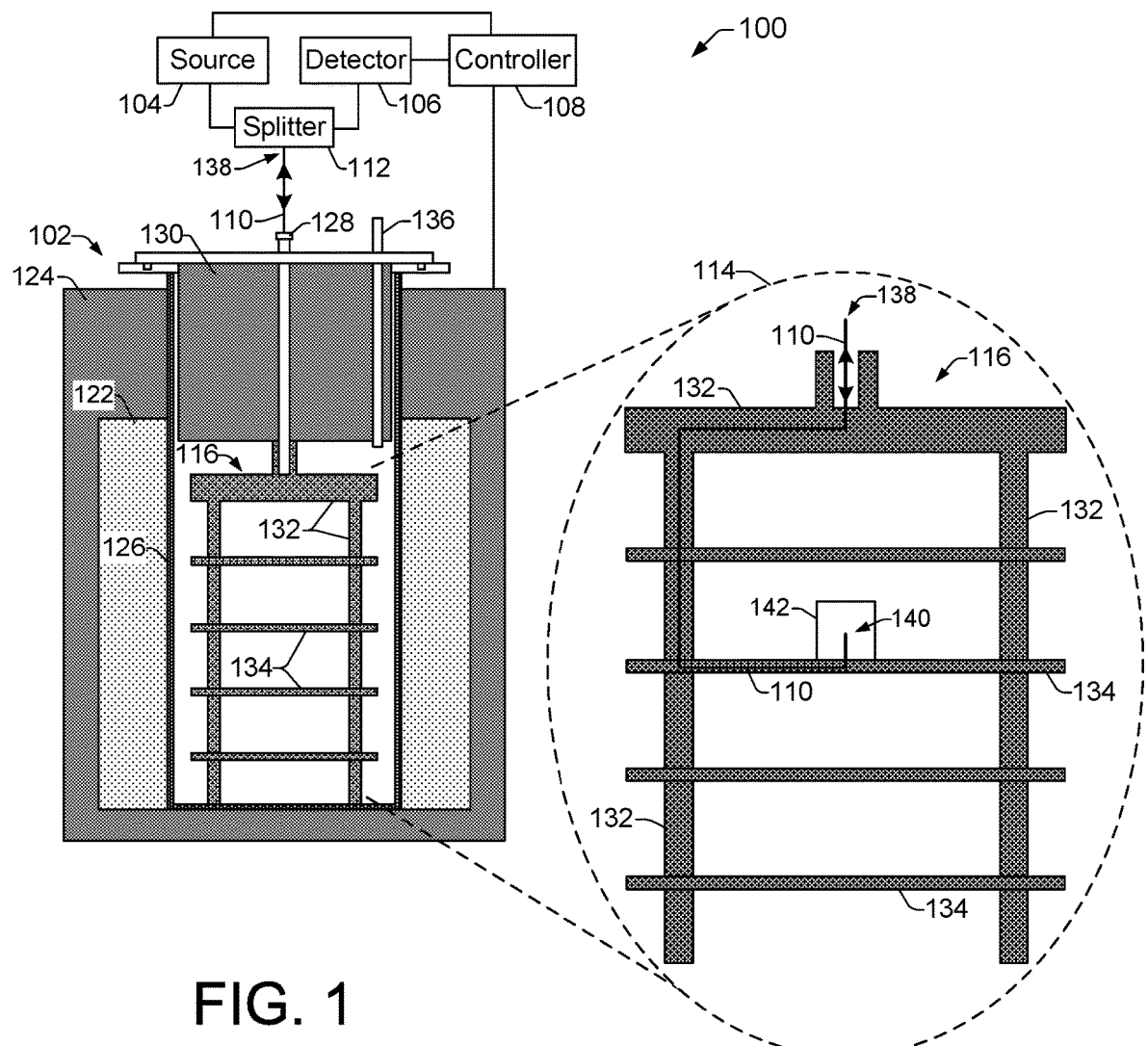
FIG. 1 shows a block diagram of an example sintering furnace system suitable for detecting the endpoint of a sintering process and providing accurate sintering cycle times based on optical sensing of a green object.

Sintering is a heat treatment process often used to improve mechanical and other properties of "green" state objects or parts produced by different manufacturing methods such as binder jet 3D printing and MIM (metal injection molding) processes. A green object is an object whose material is in a weakly bound state, such as weakly bonded powder material before it has been sintered or fired. Sintering processes expose "green" objects to high temperatures for predetermined periods of time. Time-temperature profiles for sintering processes are generally determined based on experimentation with properties including the material type, material density, wall thickness, and total mass and general thermal load of the green objects to be sintered. Such profiles are designed to control the heating and cooling cycles of the sintering process so that the green objects within a furnace load are exposed to the proper sintering temperature for the correct amount of time that will bring the objects to a sintering endpoint or completion. However, determining such time-temperature profiles can be costly due to, for example, variations in thermal properties of different materials, variations in total thermal mass between different sintering runs, variations in thermocouple calibration, and so on. In addition, the time-temperature profiles merely provide an indirect method for estimating when a sintering endpoint will be reached. Therefore, controlling sintering cycles based on predetermined time-temperature profiles can result in suboptimal quality among the sintered objects within a given sintering furnace load.

In some examples, a sintering furnace can be loaded with green objects and programmed with a particular time-temperature profile to control the heating and cooling cycle of the furnace. The time-temperature profile for a given furnace load is generally determined through trial and error based on the expected thermal load of the green objects to be sintered, which considers the mass of the load as well as the dimensional and material characteristics of the objects, as noted above. However, a furnace load can include green objects with varying characteristics, such as objects that have different thermal loads and/or different sizes, shapes, and thicknesses. In some 3D printing processes, such as binder jetting, for example, there can be a significant degree of variability among the green objects that are produced within different printing batches or within the same printing batch. Therefore, the profiles for controlling sintering cycle times are often developed to accommodate the worst-case scenario. Worst-case scenarios can be determined based on green objects that are expected to have the greatest thermal loads, the thickest object sections, and/or the types of metal powder materials that call for the longest furnace sintering times.

Because sintering cycle times are usually developed to accommodate green objects that represent such worst-case scenarios, other green objects within a same furnace load are often exposed to longer sintering times that can extend well beyond their sintering endpoints. Extended sintering times can result in over-sintering of some objects and can degrade the quality and performance of the sintered objects, as well as increase the costs associated with operating the sintering furnace, including additional time, energy, and furnace wear and tear.

As noted above, during the sintering process green objects are brought up to an appropriate sintering temperature for predetermined periods of time to achieve the sintering endpoint or completion. Sintering temperatures are generally some percentage of the melting point temperature of the metal material being sintered. For example, sintering temperatures can be on the order of 70%-90% of the melting point. Measuring and monitoring furnace temperatures to ensure that the correct sintering temperature is reached and sustained at the center of the furnace "hot zone" can be challenging and costly.

One method for monitoring temperature in a sintering furnace involves the use of thermocouples, which can add significant cost to the sintering process. Thermocouples are application specific devices because they have to be matched with the process gas and the temperatures being used for sintering the green object materials within a furnace load. In addition, thermocouples are typically located on the outside of the thermal mass cluster and are ideally routed to the center of the furnace hot zone to provide the most accurate temperature information. Furthermore, it should be noted that even when thermocouples can be used to provide accurate temperature monitoring and control over predetermined time periods, such accurate implementation of time-temperature profiles is not a definitive method for determining when a sintering endpoint has been reached. Rather, such accurate control provides at best, an indirect method for estimating when the sintering endpoint has been reached. As a result, sintering times are often extended to ensure that the worst-case objects in a furnace load reach a sintering endpoint which, as noted above, can cause over-sintering of some objects within the furnace load.

Accordingly, an example sintering system and methods described herein improve the accuracy of sintering cycle times by enabling optical sensing of a green object during sintering processes. Optical fibers, for example, can be used to sense the densification and motion (i.e., shrinkage) of a token green object being sintered in a furnace. In different examples, light reflection, light transmission, and light travel time can be compared to target values that represent the sintering endpoint (i.e., sintering completion point) of the token green object. Light delivered through an optical fiber into the furnace can be received or returned through an optical fiber after it passes by the token green object, and/or reflects off the token green object. When the received light reaches a target value, the system determines that the sintering of the token green object and other green objects being sintered is complete, and it initiates a furnace cool down phase.

Thus, in some examples a sintering system can include a single optical fiber whose distal end is held in place within the furnace by a support structure. During a sintering process, the fiber can transmit light and direct the light at a token green object supported on the support structure. Light reflecting off the object can pass back through the fiber and be processed to determine a degree of densification (i.e., shrinkage) of the object. A light source and a light detector disposed outside the furnace at the proximal end of the fiber can provide the light and detect the reflected light, respectively. The reflected light and/or the travel time of the light from the source to the detector can be compared to a target value, and a furnace cool down phase can be started when the target value is reached.

In some examples a sintering system can include two optical fibers, an illuminating optical fiber and a sensing optical fiber, whose distal ends are both held in place within the furnace by a support structure. A token green object can be positioned on the support structure between the distal ends of the illuminating and sensing fibers. During a sintering process, the illuminating fiber can transmit light and direct the light at the object. Prior to sintering, the object blocks the light being transmitted from the illuminating fiber so that the sensing fiber does not receive the light. During sintering, the object densifies and shrinks out of the way from between the distal ends of the illuminating and sensing fibers. This shrinkage enables light being transmitted from the illuminating fiber to pass by the object and be received by the sensing fiber. The transmitted light received by the sensing fiber can be compared to a target value, and a furnace cool down phase can be started when the target value is reached.

In different examples, there are various ways the received light can be analyzed to determine a sintering endpoint of the token green object and other green objects being sintered in the furnace. For example, the sintering system can be calibrated such that the first moment light is detected can be used to provide an indication of the sintering endpoint. In other examples, the intensity of the received light, the change in received light level due to changing light reflections off the token object, the rate of change of the received light level, and the travel time between when the light leaves the source and is received at the detector, can also be analyzed to determine a sintering endpoint of the token green object.

In a particular example, a sintering system includes optical fiber installed in a sintering furnace. A support structure inside the furnace is to support a token green object in a predetermined position and to hold a distal end of the fiber adjacent to the predetermined position. A light source is operably engaged at a proximal end of the fiber to transmit light through the fiber into the furnace. A light detector is operably engaged at the proximal end of the fiber to receive reflected light through the fiber that scatters off a surface of the token green object.

In another example, a method of sintering includes heating a sintering furnace to a sintering temperature. The method includes transmitting light into a sintering furnace through an optical fiber and detecting light returning from within the furnace through an optical fiber. The detected light returning from within the furnace comprises a portion of the transmitted light. The method also includes determining that green objects in the furnace have come to a sintering endpoint when the detected light reaches a predetermined target level, and initiating a furnace cool down phase upon determining the sintering endpoint. In different examples, the optical fibers can comprise a single fiber to both transmit and detect light, or separate fibers with an illuminating fiber to transmit light and a sensing fiber to detect light.

In another example, a sintering system includes an illuminating optical fiber and a sensing optical fiber installed in a sintering furnace. A support structure in the furnace holds an end of the illuminating fiber and an end of the sensing fiber facing one another across a space to be occupied by a token green object. The system includes a light source to provide light into the furnace through the illuminating fiber, and a detector to detect light through the sensing fiber from the illuminating fiber when the token green object densifies during a sintering process and clears the space.

Figure 2:
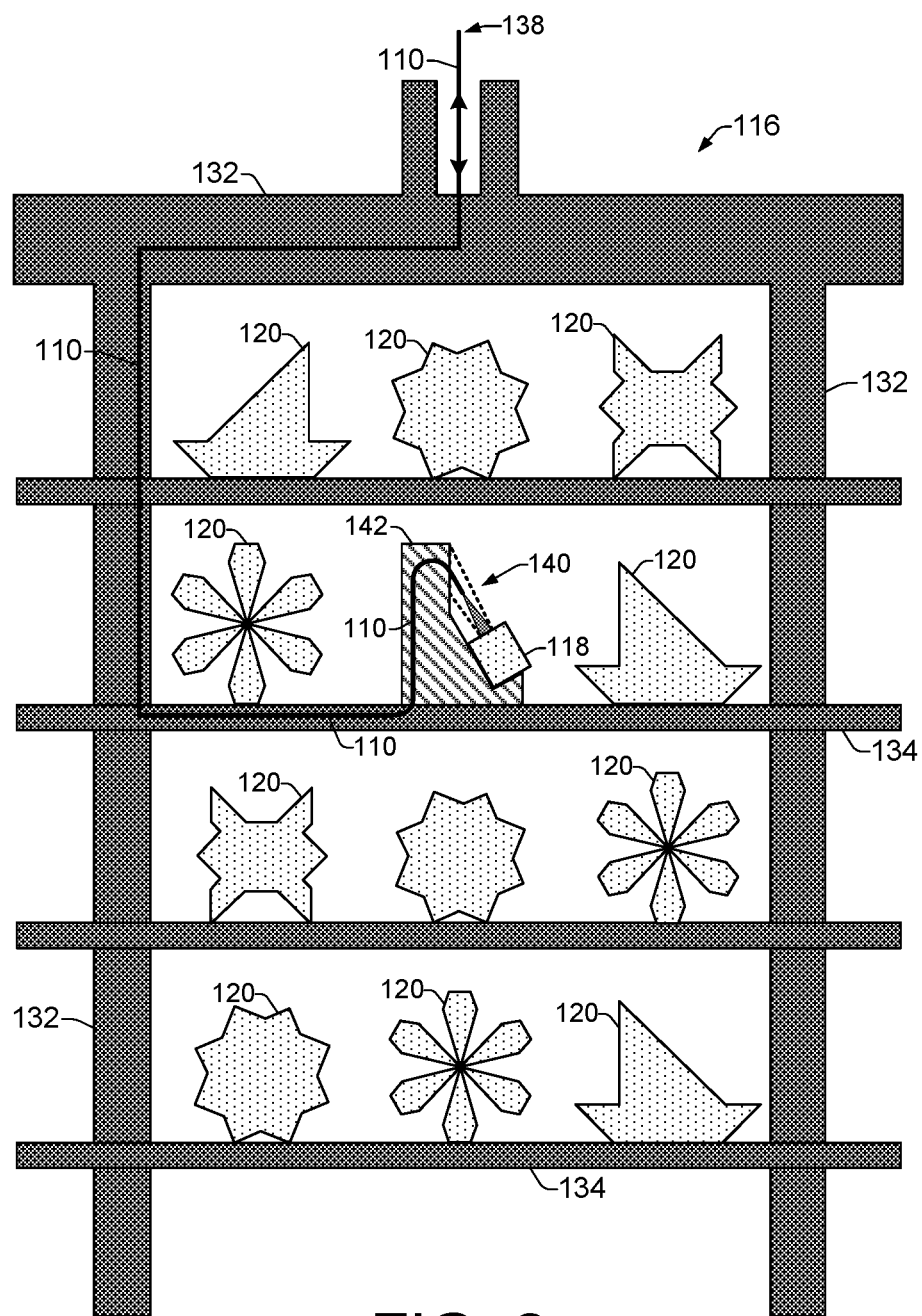
FIG. 2 shows an additional view of an example furnace rack that has been loaded with an example token green object and other example green objects for sintering.

FIG. 1 shows a block diagram of an example sintering furnace system 100 suitable for detecting the endpoint of a sintering process and providing accurate sintering cycle times based on optical sensing of a green object. The system 100 includes an example sintering furnace 102, a light source 104, a light detector 106, a controller 108, and optical fiber 110 to transmit light from the source 104 into the furnace and return light from the furnace back to the detector 106. In some examples, such as when optical fiber 110 comprises a single optical fiber, the system 100 can include a beam splitter 112 that can, among other things, direct light returning from the furnace into the detector 106. FIG. 1 includes an enlarged view 114 of an example furnace rack 116 that can support green objects inside the furnace 102 during a sintering process. FIG. 2 shows an additional view of the example furnace rack 116 that has been loaded with an example token green object 118 and other example green objects 120 for sintering.

An example controller 108 can include various components (not shown) to enable communication with, and control of, components of the example sintering system 100, such as the sintering furnace 102, the light source 104, and the light detector 106. Such controller components additionally enable the controller 108 to analyze and compare information and data received from the various components and to make determinations and initiate system functions based on such analysis and comparison. Components of the controller 108 can include, for example, a processor (CPU), a memory, various discrete electronic components, and an ASIC (application specific integrated circuit). A memory can comprise non-transitory, machine-readable (e.g., computer/processor-readable) media that can store information in the form of machine-readable coded program instructions, data structures, program instruction modules, and other data and/or instructions executable by a processor. Stored information can include, for example, experimentally determined target value data to be used to analyze and compare optical and other information that can be sensed and received from the light source 104, the light detector 106, the sintering furnace 102, and other components of system 100.

Referring generally to FIGS. 1 and 2, the example sintering furnace 102 is sometimes referred to as a "hot wall" design where electric heating elements 122 or other heating sources are located inside the furnace 102 between a layer of insulation 124 and the furnace retort wall 126. The retort wall 126 can be made from different materials including a refractory metal, ceramic, quartz, or other materials capable of withstanding high temperatures. Peak sintering temperatures in the furnace can depend on the type of material being sintered, with an example range of such temperatures reaching as high as between 1100° C. to 1400° C. In an example sintering process, once the green objects 118, 120 (sometimes referred to as the "load" or "furnace load") are loaded into the furnace on the rack 116, the controller 108 can activate the heating elements 122 to begin heating the retort 126. The retort 126 can conduct or radiate the heat to the objects within the furnace.

In some examples, gas from a supply (not shown) can be introduced into the furnace atmosphere during a sintering process. For example, a flow of gas can be provided through a furnace inlet 128 formed in the door 130 or lid of the furnace 102. Gas lines (not shown) can be routed through the frame 132 of the furnace rack 116 to gas inlet ports (not shown) formed in the frame. The gas inlet ports can deliver gas into the furnace retort 126 to flow over green objects 118, 120, positioned on the shelves 134 of the furnace rack 116. In some examples, a sintering process can include a binder burnout phase where binder material (e.g., plastics) within the green objects is broken down by high temperatures, and the broken down components of the binder material are removed by the gas as it flows across the objects. The binder burnout phase can occur at lower temperatures during the earlier part of the sintering process. For example, the binder burnout phase can occur as the temperature within the furnace reaches approximately 400° C., which happens well before the furnace temperature increases up to sintering temperatures that exceed 1000° C. A variety of gases can be introduced into the furnace including, for example, hydrogen, nitrogen, and argon. Hydrogen gas is often introduced to serve as a reducing agent that helps keep the powder metal particles in the green objects 118, 120, from oxidizing and removes other contaminants. The hydrogen reduction process helps the surfaces of the metal particles remain metallic which improves the strength of bonds that are created between particles during sintering.

In some examples, a fan (not shown) can be provided to circulate the atmosphere in the furnace. Generally, however, the pressure of gas flowing into the furnace retort 126 can push the atmosphere within the retort 126 out of the furnace, for example, through an outlet 136 located in the door 130 of the furnace 102. The atmosphere being pushed out of the furnace through the outlet 136 generally comprises gas, along with different elements being carried within the gas, such as the broken down components of the binder material, and the contaminants and water vapor that are generated by a hydrogen reduction process.

In the examples shown in FIGS. 1 and 2, the optical fiber 110 installed in the furnace 102 comprises a single optical fiber. In other examples, the optical fiber 110 may comprise alternate arrangements of optical fiber, such as multiple optical fibers, or a bundle of optical fibers. The fiber 110 comprises a fiber that is tolerant of the high temperature sintering environment, such as sapphire fiber. Single crystal sapphire optical fiber is a suitable example for the optical fiber 110 as it has a high melting temperature in excess of 2000° C. While the optical fiber 110 is shown entering the furnace 102 through a furnace inlet 128 formed in the door 130 or lid of the furnace 102, and traveling generally through the frame 132 and a shelf 134 of the furnace rack 116, it can be installed in the furnace in other ways. For example, the optical fiber 110 may enter the furnace through a side wall of the furnace. The flexibility and thin profile of the optical fiber permits installation into the furnace without the use of a window or gap in the furnace wall through which excessive heat would otherwise escape during the high temperature sintering process. The optical fiber therefore enables the passing of light into and out of the furnace without hindering the heating function of the sintering furnace.

Referring to FIGS. 1 and 2, the proximal end 138 of the single optical fiber 110 remains outside of the furnace 102 and is operably coupled to the light source 104 and light detector 106. The coupling of the fiber 110 to the source 104 and detector 106 can be made through a beam splitter 112 as noted above. The distal end 140 of the optical fiber 110 is held in a stationary position within the furnace by a support structure 142. The support structure 142 can be affixed to a shelf 134 within the furnace at a location near the center of the retort 116 in the area of the furnace hot zone. The support structure 142 can be made of a material that does not soften at high temperatures (e.g., the sintering temperature), such as Zirconia or Alumina, for example.

As shown in FIG. 2, the example support structure 142 can hold a token green object 118 in a position adjacent to the fixed distal end 140 of the single optical fiber 110. This arrangement is better illustrated in FIGS. 3A and 3B, which show enlarged views of the example support structure 142 on a furnace shelf 134 with a token green object 118 both before and after undergoing densification in a sintering process. In this arrangement, the distal end 140 of the fiber 110 faces a surface 144 of the token green object 118. Light from the outside source 104 is transmitted through the fiber and illuminates the surface 144 of the object 118. The light reflects or scatters off the surface 144 back toward the fiber 110, and some of the reflected light enters the distal end 140 of the fiber. Reflected light entering the distal end 140 of the fiber travels back out of the furnace and can be sensed by the detector 106. Thus, as discussed in more detail below, use of a single optical fiber enables both the illumination and sensing of the token green object 118, as illustrated by the examples in FIGS. 1, 2, 3A and 3B.

Figure 3A:
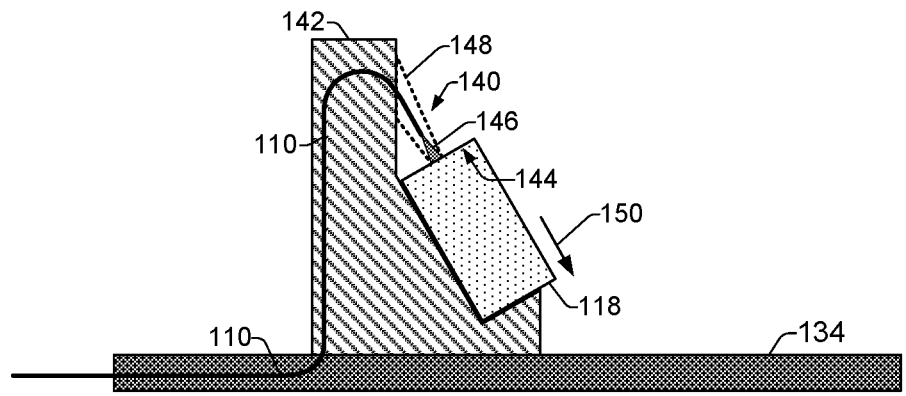
FIGS. 3A and 3B show enlarged views of an example support structure with a token green object before and after undergoing densification in a sintering process.
Figure 3B:
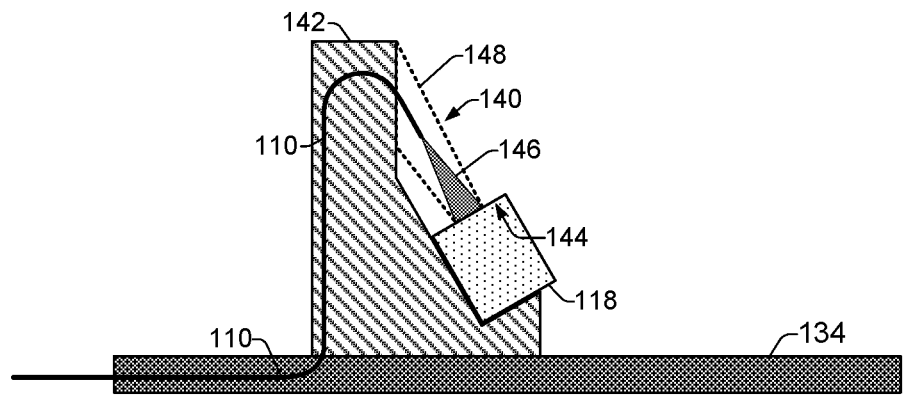

The support structure 142 shown in FIGS. 2, 3A, and 3B, is provided by way of an example and is not intended to indicate any limitation as to the size, shape, or other characteristics of such a structure. This is because features of the support structure 142, such as its size and shape, can depend in part on the size and shape of the token green object 118 that it will be supporting during a sintering process. Therefore, in other examples the support structure 142 can have different sizes and shapes in order to accommodate different token green objects 118.

The example token green object 118 comprises a sacrificial object that can be produced in the same manufacturing process batch as the other green objects 120 being sintered within the same furnace load as the token object 118, as shown in FIG. 2. As noted above, FIG. 2 shows an example of a furnace rack 116 loaded with objects that include both a token green object 118 and a number of other green objects 120 that are to be sintered in a same sintering process. The token object 118 can be produced in a same manufacturing process as the other green objects 120, such as in the same 3D binder jetting process or the same MIM process. The token object 118 is therefore materially and mechanically representative of the other green objects 120. For example, both the token object 118 and the green objects 120 can comprise the same type of powder metal material having the same material density and particle sizes. In addition, both the token object 118 and the green objects 120 will have had the same binder material added during the manufacturing process, and both will have been exposed to the same processing steps during manufacturing. In a 3D binder jetting process, for example, both the token object 118 and the other green objects 120 will undergo the same procedures such as powder layering, binder jetting, and radiation exposure using the same powder metal materials, the same binder liquid, the same binder liquid droplet sizes, the same radiation intensity, and so on.

Because the token green object 118 and the other green objects 120 comprise the same type of powder material with the same density and particle sizes, they behave in the same or similar manner during the sintering process. That is, during sintering, the green objects 120 undergo the same material densification and dimensional contraction as the token object 118 which is being optically monitored. While the token object 118 may not be the same shape or size as the other green objects 120, the token object 118 can be designed to match the average wall thickness of the green objects 120 to be sintered. Regardless, however, the sintering time of green objects does not change significantly based on the relative thickness or size of the objects. Rather, the main factors that determine sintering times are the density of the object, the material type, and the particle size distribution of the material. The object thickness and size are of less significance in affecting sintering times because the time constants for heat transfer are smaller than the time constants for sintering. Thus, the time to heat both a small and large object, or a thin and thick object, is mostly insignificant in comparison to the time it takes the objects to begin densification during the sintering process. Therefore, the sintering time for a smaller object such as a token object 118, is very close to the sintering time for a larger object such as the other green objects 120 shown in FIG. 2. Consequently, dimensional changes in the token object 118 that occur during sintering can be used to indicate corresponding changes in the other green objects 120 throughout the sintering process, including indicating the point when the sintering process reaches an endpoint.

Referring again generally to FIGS. 3A and 3B, when a token green object 118 is first loaded onto the support structure 142 (FIG. 3A), the distance between the distal end 140 of the fiber 110 and the surface 144 of the token green object 118 is at a minimum, or lowest amount. The distance between the fiber 110 and token green object 118 remains generally the same (i.e., at a minimum) during part of a sintering process, such as during the burnout phase, but then it begins to increase at some point after the furnace 102 reaches the sintering temperature when the token green object 118 begins to densify and shrink away from the fiber 110. During a binder burnout phase, for example, when the furnace can reach temperatures on the order of 400° C., the distance between the fiber 110 and surface 144 of the object 118 will still be at a minimum, because the object 118 will not yet be densifying.

As shown in FIG. 3A, light from a source 104 travels through the optical fiber 110 and forms a cone-shaped illumination area 146 when emitted at the distal end 140 of the fiber 110. This "illumination-reception cone" 146 shows the angle that light is emitted from the fiber, as well as the angle that light is received by the fiber. The angle of the "illumination-reception cone" 146 is defined by the numerical aperture (NA) of the fiber, which can vary for different types of optical fiber. As shown in FIG. 3A, light emitted from the fiber 110 can scatter, or reflect off of the surface 144 of the token green object 118 and bounce back to the fiber. The reflected light 148 is illustrated in FIGS. 3A and 3B as a cone-shaped dashed line 148. Some of the reflected light 148 that bounces off the token green object 118 enters the distal end 140 of the fiber 110 and travels back through the fiber to the proximal end 138 (FIGS. 1, 2) where it is sensed by the detector 106.

As shown in FIG. 3B, the token green object 118 has undergone a sintering process and has densified (i.e. shrunk), causing the surface 144 of the object 118 to move farther away from the distal end 140 of the fiber 110, as indicated by the direction arrow 150 shown in FIG. 3A. The increase in distance between the surface 144 of the object 118 and the distal end 140 of the fiber 110 changes the amount of reflected light 148 that enters the distal end 140 of the fiber 110. In addition, the increased distance between the surface 144 of the object 118 and the distal end 140 of the fiber 110 increases the amount of time it takes for light from the source 104 to be reflected back to the detector 106.

In different examples, the controller 108 can analyze information from the source 104 and detector 106 during a sintering process to determine when the token green object 118 and other green objects 120 have reached a sintering endpoint. In one example, the controller 108 can determine the amount of time (i.e., the time of flight, TOF) it takes for light from the source 104 to reflect off the token green object 118 back to the detector 106. As indicated above, the TOF increases as the sintering process takes the token green object 118 from a non-densified state as in FIG. 3A to a densified state as in FIG. 3B. The controller 108 can compare the TOF with a predetermined target time that is experimentally known to correspond with the point at which the token green object 118 will have reached the sintering endpoint. When the TOF reaches the predetermined target time, the controller 108 can determine that the token green object 118 and other green objects 120 have reached the sintering endpoint. The controller 108 can then control the sintering cycle, for example, by initiating a furnace cool down phase.

In some examples, the controller 108 can analyze information from the source 104 and detector 106 during a sintering process to determine a measured rate of change of the TOF. The controller 108 can compare the measured TOF rate of change with a predetermined target TOF rate of change that is experimentally known to correspond with the point at which the token green object 118 will have reached the sintering endpoint. When the measured TOF rate of change reaches the target TOF rate of change, the controller 108 can determine that the token green object 118 and other green objects 120 have reached the sintering endpoint, and can initiate a furnace cool down phase.

In another example, the controller 108 can receive information from the detector 106 indicating the amount or intensity of reflected light 148 being sensed by the detector 106 during a sintering process. The intensity of the reflected light can be measured, for example, in units of Watts (W) at the detector 106. The controller 108 can compare the reflected light intensity sensed by the detector 106 with a predetermined target intensity that is experimentally known to correspond with the point at which the token green object 118 will have reached the sintering endpoint. When the reflected light intensity reaches the target intensity, the controller 108 can determine that the token green object 118 and other green objects 120 have reached the sintering endpoint. The controller 108 can then initiate a furnace cool down phase.

In some examples, the controller 108 can determine a rate of change of reflected light intensity, and compare the rate of change of reflected light intensity with a predetermined target intensity rate of change that is experimentally known to correspond with the point at which the token green object 118 will have reached the sintering endpoint. When the rate of change of reflected light intensity reaches the target intensity rate of change, the controller 108 can determine that the token green object 118 and other green objects 120 have reached the sintering endpoint, and can initiate a furnace cool down phase.

Figure 4:
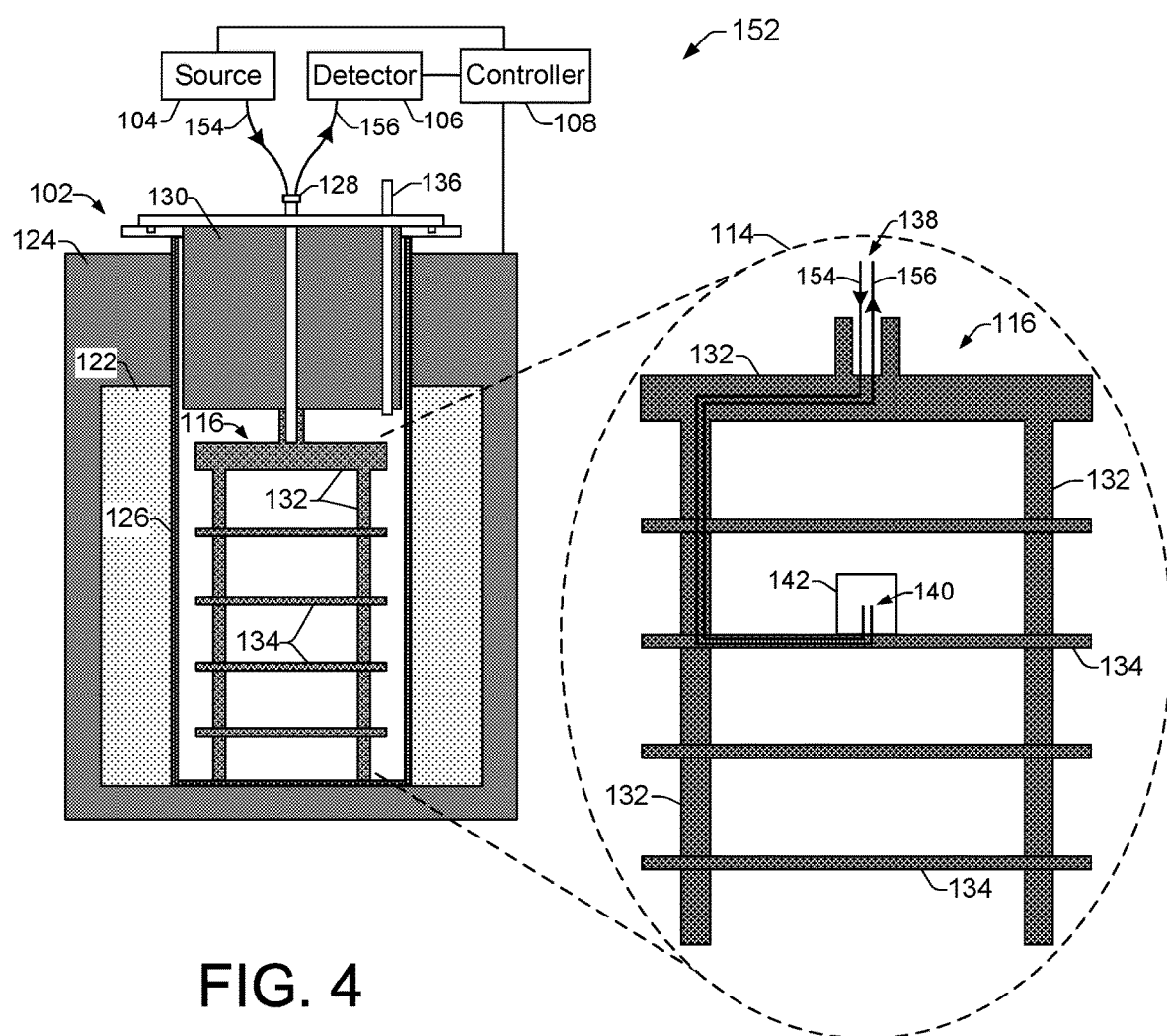
FIG. 4 shows a block diagram of another example sintering furnace system suitable for detecting the endpoint of a sintering process and providing accurate sintering cycle times based on optical sensing of a green object.
Figure 5:
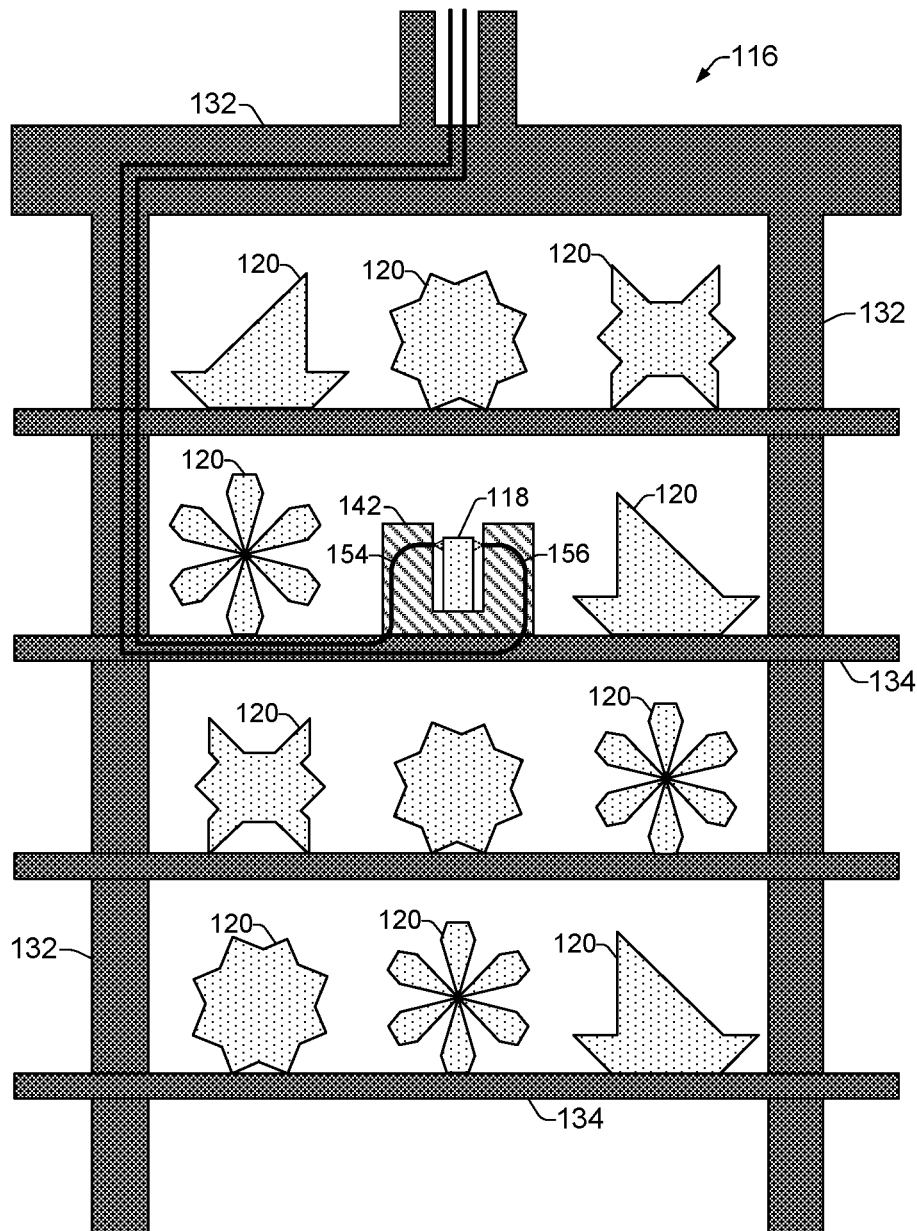
FIG. 5 shows a view of an example furnace rack that has been loaded with green objects for sintering, including an example token green object positioned between distal ends of the two optical fibers.
Figure 6A:
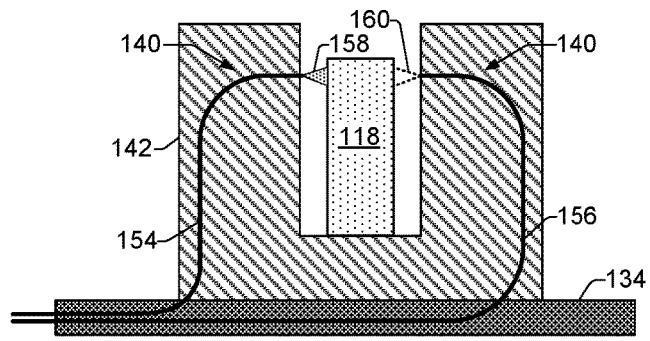
FIGS. 6A and 6B show enlarged views of an example support structure with a token green object before and after undergoing densification in a sintering process.
Figure 6B:
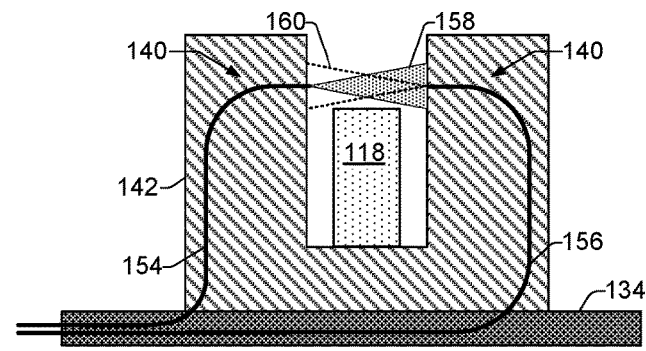

FIG. 4 shows a block diagram of another example sintering furnace system 152 suitable for detecting the endpoint of a sintering process and providing accurate sintering cycle times based on optical sensing of a green object. The system 152 illustrated in FIG. 4 is mostly the same as the system 100 illustrated and discussed above with regard to FIG. 1, except that it includes two optical fibers 154, 156, arranged to sense transmitted light, instead of a single optical fiber 110 to sense reflected light. As noted above, Sapphire fiber is a suitable fiber for use in a high temperature sintering environment. FIG. 5 shows a view of the example furnace rack 116 from system 152 in FIG. 4 that has been loaded with green objects 120 for sintering, including an example token green object 118 positioned on an example support structure 142 between distal ends of the two optical fibers 154, 156. FIGS. 6A and 6B show enlarged views of the example support structure 142 with a token green object 118 both before (FIG. 6A) and after (FIG. 6B) undergoing densification in a sintering process.

Referring generally to FIGS. 4-6, the optical fibers in the sintering system 152 comprise an illuminating fiber 154 and a sensing fiber 156, alternately referred to as a light-entering fiber 154 and a light-exiting fiber 156. Fixed distal ends 140 of the illuminating fiber 154 and sensing fiber 156 are held in a position by a support structure 142 such that they face one another across a small space that can be occupied by a token green object 118. In some examples, the small space can be on the order of 1 centimeter across, and in general is as small a distance as practicable that is consistent with having a representative token green object 118 to be sintered. The closer the facing fibers 154 and 156 are to one another, the greater the light transmission can be between them.

As shown in FIG. 6A, the example token green object 118 is in a non-densified state, for example, as it would be when it is initially loaded into the furnace 102, and as it would generally remain until the furnace reaches the sintering temperature and densification begins. As noted above, the token green object 118 will have approximately the same geometry/size before, during, and after the binder burn out phase, until densification begins. As the object 118 densifies, it shrinks and begins to clear the optical path between the illuminating fiber 154 and a sensing fiber 156. As this occurs, light transmitted from the illuminating fiber 154 will travel past the object 118 and be received by the sensing fiber 156. FIG. 6B is intended to show the example token green object 118 in a fully densified state (i.e. at a sintering endpoint) where it has moved completely out of the path of the light being transmitted from the illuminating fiber 154. In general, transmitted light received by the sensing fiber 156 travels back out of the furnace and is detected at the detector 106, where it can be analyzed by the controller 108 to make determinations such as when the sintering endpoint has been reached for the token green object 118 and other green objects 120 being sintered in the furnace 102.

In a similar manner as discussed above regarding the single optical fiber 110, light from a source 104 travels through the illuminating fiber 154 and forms a cone-shaped illumination area 158 when emitted at the distal end 140 of the fiber 154. This "illumination cone" 158 shows the angle through which light is emitted from the fiber. Similarly, the sensing fiber 156 has a "receiving cone" 160 defined by an angle in which light can be received. The angles of the "illumination cone" 158 and "receiving cone" 160 are defined by the numerical apertures (NA) of the respective illumination fiber 154 and sensing fiber 156. In this example, the angle of the cones 158 and 160 is the same, because the same type of fiber is used for both the illumination fiber 154 and sensing fiber 156.

Figure 6C:
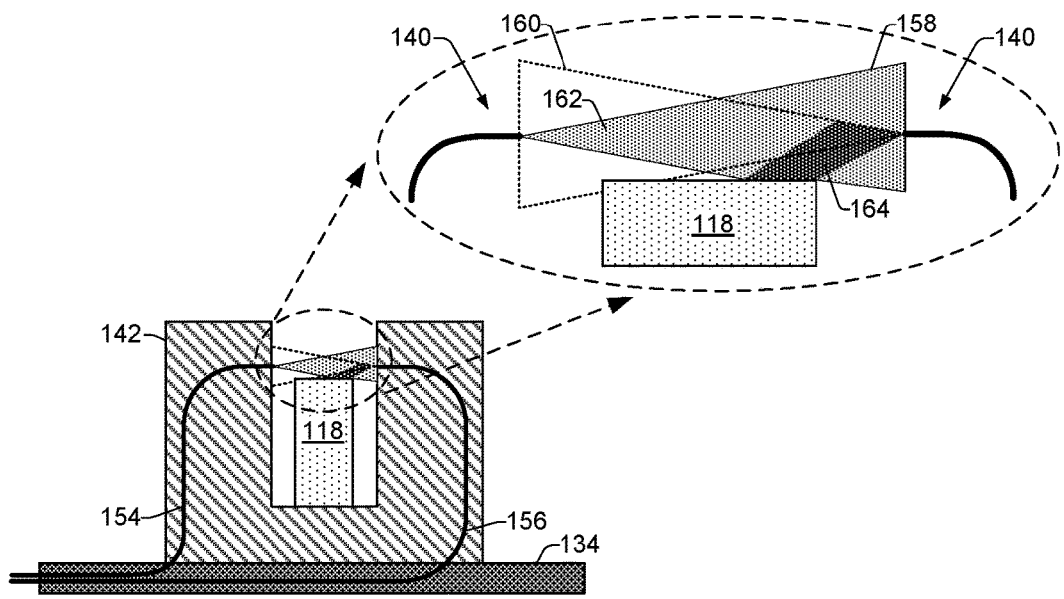
FIG. 6C shows an example token green object in a partially densified state prior to reaching a sintering endpoint.

FIG. 6C shows an example token green object 118 in a partially densified state prior to a sintering endpoint where the object has moved partially out of the path of the light being transmitted from the illuminating fiber 154. In a partially densified state, the sensing fiber 156 can receive transmitted light 162 directly along the cleared path between the illumination fiber 154 and sensing fiber 156, as well as some amount of reflected light 164 that scatters off of the top surface of the token green object 118 as it shrinks. Accordingly, in some examples where a token green object 118 causes reflected light as it undergoes densification, the total amount of light received by the sensing fiber 156 can include both transmitted light 162 and reflected light 164 during part of the densification process.

Figure 7A:
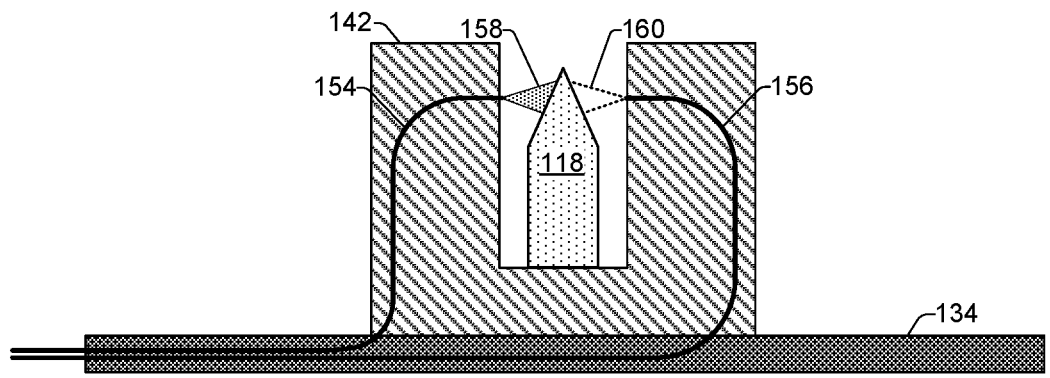
FIGS. 7A and 7B show an example token green object comprising an "a-frame" geometry; and, FIGS. 8 and 9 are flow diagrams showing example methods of sintering.
Figure 7B:
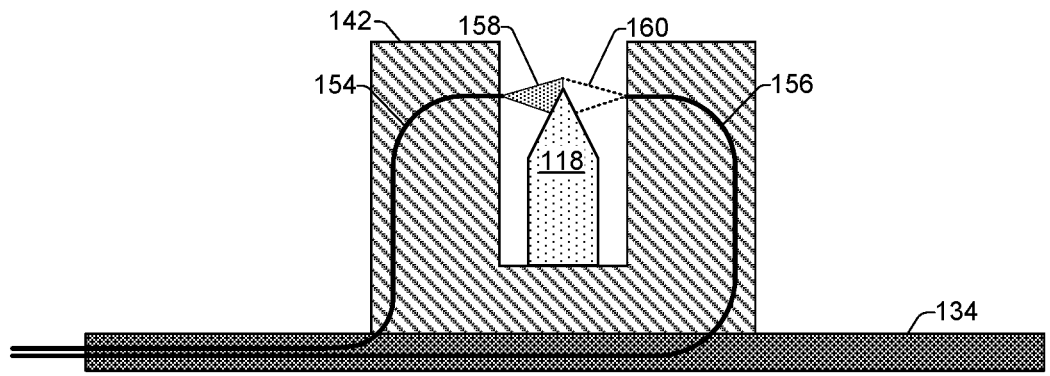

FIGS. 7A and 7B show an example token green object 118 comprising an "a-frame" geometry that enables the sensing fiber 156 to receive transmitted light from the illuminating fiber 154 as the object 118 densifies. In FIG. 7A, the example token green object 118 is in a non-densified state, and it blocks the optical path between the illuminating fiber 154 and sensing fiber 156. As shown in FIG. 7B, as the object 118 begins to densify and shrink partially out of the optical path, transmitted light from the illuminating fiber 154 is received by the sensing fiber 156, but any light that reflects off the objects 118 is not received by the sensing fiber 156. Thus, the geometry of the example token green object 118 can be manipulated to control whether the sensing fiber 156 receives both transmitted and reflected light, or just transmitted light. In different examples, the geometry, texture, patterning, and other features of the top portion of a token green object 118 can also be manipulated to control the degree of reflected light received by the sensing fiber 156 during a sintering process.

Referring generally to the system 152 of FIG. 4 and the subsequent examples in FIGS. 5-7, a controller 108 can analyze information from the source 104 and detector 106 during a sintering process to determine when a token green object 118 and other green objects 120 have reached a sintering endpoint. In one example, during a sintering process the controller 108 can receive a notification from the detector 106 at the first instant light transmitted from the illuminating fiber 154 is received by the sensing fiber 156 and detected by detector 106. Based on previous experimentation and calibration of a token green object 118, the first detection of light by the detector 106 can be associated with a determination that the token green object 118 and other green objects 120 have reached a sintering endpoint. Upon such determination, the controller 108 can initiate a furnace cool down phase in the sintering process.

In some examples, upon receiving a notification that a first instant of light transmitted from the illuminating fiber 154 has been received by the sensing fiber 156 and detected by the detector 106, the controller 108 can initiate a time delay that has been experimentally determined to indicate when the token green object 118 and other green objects 120 have reached a sintering endpoint. Upon expiration of the time delay, the controller 108 can determine that the sintering endpoint has been reached, and can initiate a furnace cool down phase.

In some examples, the controller 108 can receive information from the detector 106 during a sintering process indicating the amount or intensity of light being received by the sensing fiber 156 and detected by the detector 106. The received light can be transmitted light from the illuminating fiber 154 that is received directly by the sensing fiber 156 as shown in FIG. 6B, or it can be a combination of transmitted light that is directly received and transmitted light that is reflected off of the token green object 118 as shown in FIG. 6C.

Figure 8:
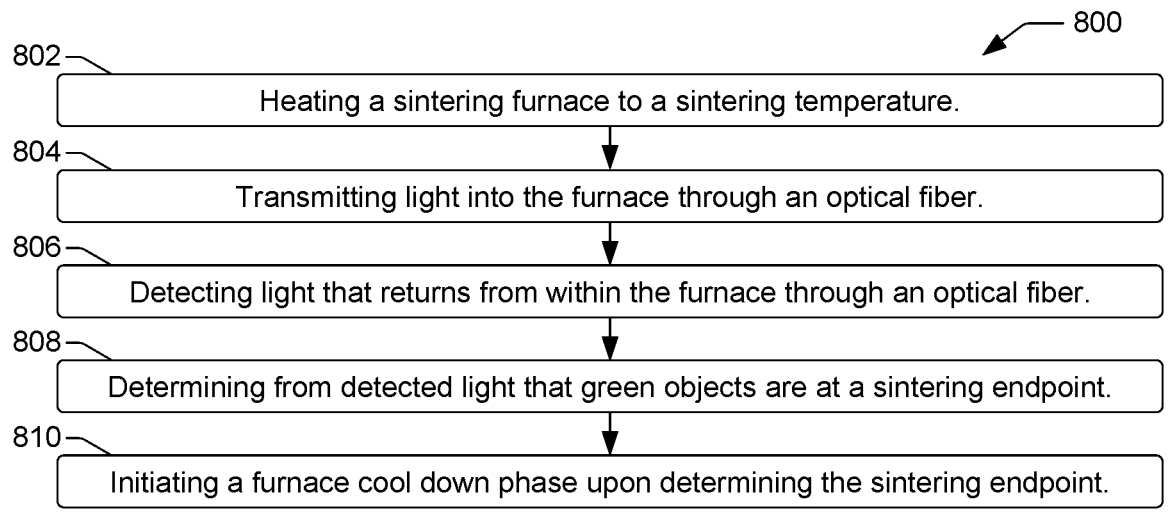
Figure 9:
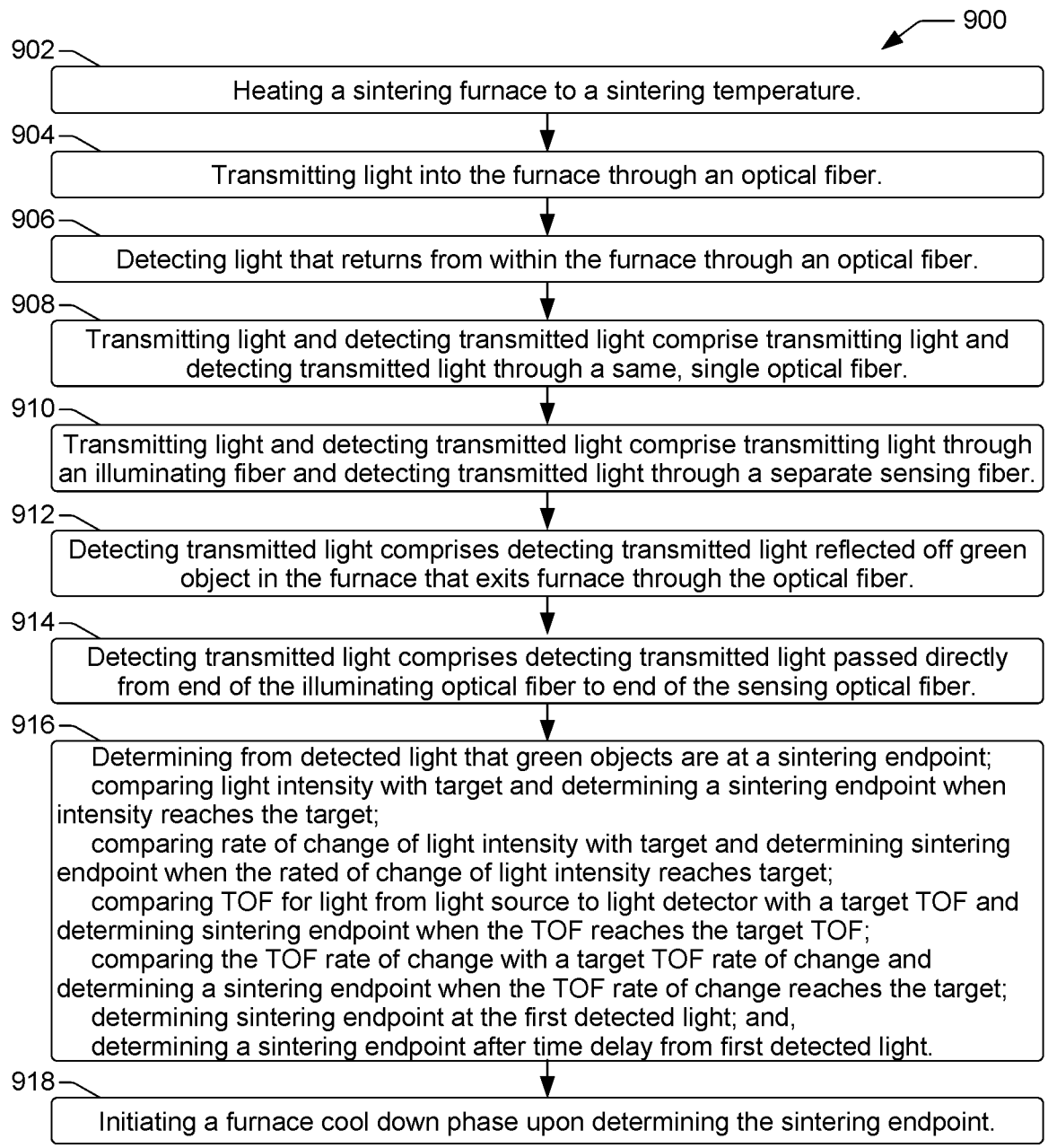

FIGS. 8 and 9 are flow diagrams showing example methods, 800 and 900, of sintering. Method 900 comprises an extension of method 800 and thereby incorporates additional details of method 800. The methods are associated with examples discussed above with regard to FIGS. 1-7, and details of the operations shown in the methods can be found in the related discussion of such examples. The operations of the methods may be embodied as programming instructions stored on a memory of a controller 108 and executable on controller 108.

Referring now to the flow diagram of FIG. 8, an example method of sintering, 800, begins at block 802 with heating a sintering furnace to a sintering temperature. The method includes transmitting light into the sintering furnace through an optical fiber (804), detecting some of the transmitted light that returns from within the furnace through an optical fiber (block 806), and determining from the detected light that green objects being sintered in the furnace have come to a sintering endpoint (block 808). Upon determining the sintering endpoint, a furnace cool down phase can be initiated (block 810).

Referring to the flow diagram of FIG. 9, another example method of sintering, 900, begins at block 902 with heating a sintering furnace to a sintering temperature. The method includes transmitting light into the furnace through an optical fiber (block 904), and detecting some of the transmitted light that returns from within the furnace through an optical fiber (block 906). In some examples, transmitting light through an optical fiber and detecting transmitted light through an optical fiber comprises transmitting light and detecting transmitted light through a same, single optical fiber (block 908). In some examples, transmitting light through an optical fiber and detecting transmitted light through an optical fiber comprise, respectively, transmitting light through an illuminating optical fiber and detecting transmitted light through a separate sensing optical fiber (block 910). In some examples, detecting transmitted light comprises detecting transmitted light that has reflected off of a green object in the furnace and exited the furnace through the optical fiber (block 912). In some examples, detecting transmitted light comprises detecting transmitted light that has passed directly from an end of the illuminating optical fiber to an end of the sensing optical fiber (block 914).

The method can include determining from the detected light that green objects being sintered in the furnace have come to a sintering endpoint (block 916). In different examples, determining from the detected light that green objects have come to a sintering endpoint comprises one of: comparing detected light intensity with a target intensity and determining a sintering endpoint when the detected light intensity reaches the target intensity; comparing a rate of change of detected light intensity with a target rate of change of intensity and determining a sintering endpoint when the rated of change of detected light intensity reaches the target rate of change of intensity; comparing a TOF (time of flight) for light transmitted into the furnace from a light source and detected outside the furnace at a light detector with a target TOF and determining a sintering endpoint when the TOF reaches the target TOF; comparing the TOF rate of change with a target TOF rate of change and determining a sintering endpoint when the TOF rate of change reaches the target TOF rate of change; determining a sintering endpoint at the first instant of detected light; and, determining a sintering endpoint after a predetermined time delay beginning at the first instant of detected light. Upon determining the sintering endpoint, a furnace cool down phase can be initiated (block 918).

What is claimed is:
1. A sintering system comprising:
an optical fiber installed into a sintering furnace, the sintering furnace configured to hold a token green object and a green object as a same furnace load during a same sintering process, wherein the token green object represents the green object but is distinct from the green object;
a support structure in the furnace sized and configured to support the token green object in a predetermined position that is separate from a position of the green object, the support structure configured to hold a distal end of the fiber adjacent to the predetermined position;
a light source operably engaged at a proximal end of the fiber to transmit light through the fiber into the furnace
a light detector operably engaged at the proximal end of the fiber to receive, via the fiber, reflected light scattered off a surface of the token green object; and
a controller communicatively coupled to the light source and the light detector, the controller configured to:
determine a densification or shrinkage level of the green object based on the reflected light scattered off the surface of the token green object; and initiate a furnace cool down phase of the sintering furnace based on the densification or shrinkage level reaching a target level.

2. A sintering system as in claim 1, wherein the reflected light is associated with intensity of the received light and wherein the target level includes a predetermined target intensity level, and wherein the initiating of the furnace cool down phase includes initiating the furnace cool down phase when the intensity of the received light reaches the target intensity level.

3. A sintering system as in claim 1, wherein the reflected light is associated with a TOF (time of flight) for light traveling from the light source to the light detector, and wherein the target level includes a predetermined target TOF, and wherein the controller is further to determine that the green object has reached a sintering endpoint based on the comparison.

4. A sintering system as in claim 3, wherein the controller is to initiate the furnace cool down phase upon determining that the token green object has reached the sintering endpoint.

5. A sintering system as in claim 1, further comprising a beam splitter that couples the proximal end of the fiber to the light source and the light detector, the beam splitter to direct reflected light into the light detector.

6. A sintering system as in claim 1, wherein the optical fiber comprises a sapphire optical fiber.

7. A method of sintering comprising:
heating a sintering furnace while a token green object and a green object are in the sintering furnace, the sintering furnace being heated to a sintering temperature;
transmitting light through an optical fiber and onto the token green object;
detecting at least some of the transmitted light that returns from within the furnace through the optical fiber or another optical fiber;
based on the detected light that returns from within the furnace, determining a densification or shrinkage level of the green object being sintered in the furnace;
based on determining that the densification or shrinkage level of the green object reaches a predetermined densification or shrinkage level, determining that the green object being sintered in the furnace has come to a sintering endpoint; and,
initiating a furnace cool down phase in response to the determining that the green object has come to the sintering endpoint.

8. A method as in claim 7 wherein transmitting light through an optical fiber and detecting transmitted light through an optical fiber comprises transmitting light and detecting transmitted light through a same, single optical fiber.

9. A method as in claim 7, wherein transmitting light through an optical fiber and detecting transmitted light through an optical fiber comprise, respectively, transmitting light through an illuminating optical fiber and detecting transmitted light through a separate sensing optical fiber.

10. A method as in claim 7, wherein detecting transmitted light comprises detecting transmitted light that has reflected off of the green object in the furnace and exited the furnace through the optical fiber.

11. A method as in claim 9, wherein detecting transmitted light comprises detecting transmitted light that has passed directly from an end of the illuminating optical fiber to an end of the sensing optical fiber.

12. A method as in claim 7, wherein determining that the green object has come to a sintering endpoint comprises one of:
comparing a rate of change of detected light intensity with a target rate of change of intensity and determining a sintering endpoint when the rated of change of detected light intensity reaches the target rate of change of intensity;
comparing a TOF (time of flight) for light transmitted into the furnace from a light source and detected outside the furnace at a light detector with a target TOF and determining a sintering endpoint when the TOF reaches the target TOF;
comparing the TOF rate of change with a target TOF rate of change and determining a sintering endpoint when the TOF rate of change reaches the target TOF rate of change;
determining a sintering endpoint at the first instant of detected light; and,
determining a sintering endpoint after a predetermined time delay beginning at the first instant of detected light.

13. A sintering system comprising:
first optical fiber and a second optical fiber each extending from a proximal end outside a sintering furnace to a distal end inside the sintering furnace;
a support structure to hold the distal ends of the optical fibers in fixed positions such that the distal end of the first optical fiber faces the distal end of the second optical fiber across a space to be occupied by a token green object;
a light source to provide light into the furnace through the proximal end of the first optical fiber;
a detector outside of the furnace, the detector configured to detect light exiting the proximal end of the second optical fiber when the token green object densifies during a sintering process to clear the space between the distal end of the first optical fiber and the distal end of the second optical fiber to permit transmission of the light from the first optical fiber, over the densified token green object, and through the second optical fiber, wherein the token green object is to block the light from entering the second optical fiber when the token green object is in a non-densified state; and
a controller configured to:
compare one or more values associated with the detected light to one or more predetermined target values, wherein the one or more values indicate one or more densification or shrinkage levels of the token green object, and wherein the one or more predetermined target values correspond to one or more predetermined densification or shrinkage levels; and
initiate a furnace cool down phase in response to the one or more values reaching the one or more predetermined target values.

14. A sintering system as in claim 13, wherein the optical fibers travel from inside a frame and shelf of a furnace rack to inside the support structure such that only the distal ends are exposed in the furnace at the support structure, wherein furnace includes the frame, the shelf, and the furnace rack.

* * * * *